Dec. 8, 1964 F. G. MERRILL ETAL 3,160,831
EQUAL POWER LOSS IMPEDANCE MATCHING BRANCHING NETWORK
Filed Oct. 3, 1962
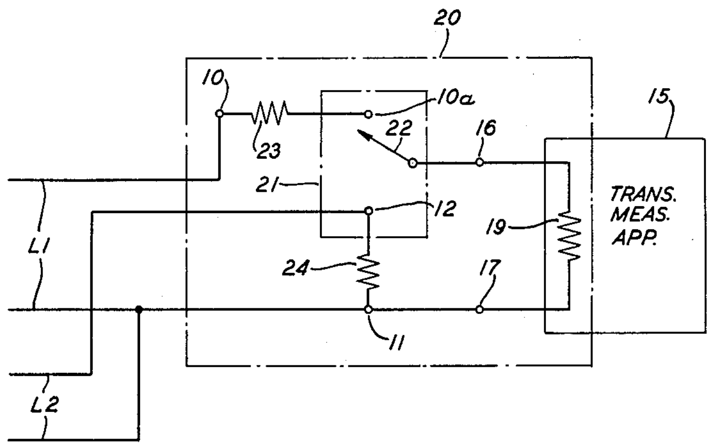
INVENTORS F. G. MERRILL
P. J. SNYDER
BY Patrick J. Roche
ATTORNEY United States Patent Office 3,160,831
Patented Dec. 8, 1964

3,160,831

EQUAL POWER LOSS IMPEDANCE MATCHING BRANCHING NETWORK

Francis G. Merrill, Chatham, and Paul J. Snyder, Summit, N.J., assignors to Bell Telephone Laboratories, Incorporated, New York, N.Y., a corporation of New York
Filed Oct. 3, 1962, Ser. No. 228,073
9 Claims. (Cl. 333—8)

This invention relates to a signal transmission system, and more specifically to an impedance network for interconnecting two signaling circuits of different impedances.

Two circuits of different impedances for transmitting signals over a band of frequencies have been heretofore connected by transformers, resistive networks, or resistive and reactive networks. In many instances, if not all, a prime consideration was to obviate providing such connections with a frequency characteristic. That is to say, it was desirable to provide such connecting networks so as to avoid an impedance mismatch of such two circuits at any of the frequencies of the transmitted signals. Such connecting networks may be expeditiously designed where factors of cost, complexity, bulk and weight are not involved.

The present invention provides an impedance network for connecting either one of two signal transmission lines of different impedances to a common circuit at a given time while maintaining a uniform loss for the signals transmitted from both lines to such network.

It is a principal object of the invention to provide an improved arrangement for connecting either one of two signaling lines of different impedances to a common circuit.

It is another object to match the output impedance of either one of two signaling lines to the input impedance of a comon receiving circuit.

It is a further object to connect the output of either one of two signaling lines to a common circuit substantially with the same loss for the signals of both signal lines as applied to the common circuit.

It is still another object to connect either one of the two signal lines of different impedances to a passive circuit for measuring the transmission loss on the respective signal lines.

In association with a signaling transmission system including two signaling lines of different terminating impedances and a circuit for measuring the signal levels on either one of the two lines at a given time, the present invention comprises an impedance matching network consisting of the input of the measuring circuit provided with an impedance value which is the geometric mean of the terminating impedances of the two signaling lines, a first impedance connected in series between one output terminal of the signaling line of the higher impedance and one input terminal of the measuring circuit when the signaling line of the lower impedance is disconnected from the system, and a second impedance connected in shunt of the output terminals of the signaling line of the lower impedance and of the input of the measuring circuit when the signaling line of the higher impedance and the associated first impedance are disconnected from the system.

The first impedance serves to match the output impedance of the signaling line of the higher impedance to the input impedance of the measuring circuit while the second impedance serves to match the output impedance of the signaling line of the lower impedance to the input impedance of the measuring circuit, both impedance matchings looking in the direction from the outputs of both signaling lines toward the input of the measuring circuit.

An important feature of the invention is that the first and second impedances for matching the outputs of the signaling lines of the high and lower terminating impedances, respectively, are single resistors.

Another feature is that impedance matching network including the geometric mean impedance and the first and second impedances are resistive.

A further feature is that the impedance matching network comprising simple resistors enables the signaling loss therein to be held to a relatively small magnitude.

The invention will be readily understood from the following description taken together with the accompanying drawing which is a schematic circuit illustrating a specific embodiment of the invention.

Referring to the drawing, a signaling line L1 is provided with an impedance of the order of 900 ohms at its output terminals 10 and 11, and a signaling line L2 is provided with an impedance of the order of 600 ohms at its output terminals 11 and 12. These two lines are transmitting, for the purpose of this description, signals whose frequencies lie in the range from 300 to 5000 cycles per second. A transmission measuring apparatus includes input terminals 16 and 17 and serves to measure the levels of the signals transmitted on lines L1 and L2.

In accordance with the present invention, an impedance matching network 20 serves to connect either the output terminals 10 and 11 of line L1 or the output terminals 11 and 12 of line L2 to input terminals 16 and 17 of the transmission measuring apparatus. This network comprises the input impedance of the transmission measuring apparatus as represented by resistor 19 provided with a value of 735 ohms which constitutes the geometric mean of the 900 and 600-ohm lines L1 and L2, respectively. This geometric mean comprises the square root of the product of the terminating impedances of lines L1 and L2.

A single pole double throw switch 21 includes a movable arm 22 which is operable to connect either the line L1 or L2 to the input terminals 16 and 17 of the transmission measuring apparatus at a given time but not both lines at the same time in a manner that is now explained.

The line L1 is connected to the input terminals 16 and 17 of transmission measuring apparatus by actuating arm 22 to engage contact 10*a*. This connects resistor 23 in series in one lead of line L1 with transmission measuring input terminal 16. At the same time, the other lead of line L1 is directly connected to the other measuring input terminal 17. This connects line L1 to the transmission measuring input terminals 16 and 17, and at the same time disconnects line L2 therefrom. For the purpose of this description resistor 23 is provided with an impedance of 165 ohms.

It is noted that the sum of the 735-ohm impedance 19 connected to the transmission measuring terminals 16 and 17 and the 165-ohm impedance of resistor 23 is equal to 900 ohms which is the terminating impedance of line L1. The terminating impedance of line L1 is thus matched to the input impedance of the transmission measuring apparatus, looking in the direction from the termination of the last-mentioned line toward the first impedance 23 and the transmission measuring terminals 16 and 17. For the level of the signals available at the output of line L1 in the range from −25 through +10 dbm, the signal loss was held approximately to 0.88 db at the transmission measuring terminals 16 and 17.

The line L2 is connected to the input terminals 16 and 17 of transmission measuring apparatus by actuating arm 22 to engage contact 12. This connects resistor 24 in shunt of the transmission measuring input terminals 16 and 17, or in shunt of the input impedance 19 thereof. This connects line L2 to the transmission measuring input terminals 16 and 17, and at the same disconnects line L1 therefrom. For the purpose of this description resistor 24 is provided with an impedance of 3265 ohms.

It is noted that the sum of the 735 and 3265-ohm impedances connected in parallel at the transmission measuring terminals 16 and 17 is equal to the 600-ohm terminating impedance of line L2. The terminating impedance of line L2 is thus matched to the input impedance of the transmission measuring apparatus, looking in the direction from the termination of the last-mentioned line toward the second impedance 24 and the transmission measuring terminals 16 and 17. For the level of the signals available at the output of line L2 in the range from −25 through +10 dbm, the signal loss was held approximately to 0.88 db at the transmission measuring terminals. It is thus evident that the impedance matching network establishes the same transmission loss at the measuring terminals 16 and 17 for the signals incoming on lines L1 and L2.

It is understood that the invention is herein described with specific parameters for the purpose of this description. It is to be further understood that such parameters are merely illustrative of the application of the principles of the invention. Numerous other arrangements and parameters may be devised by those skilled in the art without departing from the spirit and scope of the invention.

What is claimed is:

1. In a signal transmission system, a pair of lines, each having two output terminals, said output terminal pairs having different impedances thereacross, signal receiving apparatus having a pair of input terminals, and impedance matching means connecting the output terminals of only one of said lines to said apparatus input terminals at a given time, comprising said apparatus input terminals having an impedance equal to the geometric mean value of the different impedances at said two pairs of output terminals, and a first impedance removably connectable in series between one of the two output terminals having the higher impedance thereacross and one of said apparatus input terminals, the impedances of said first impedance and at said apparatus input terminals so proportioned as to match the impedance across said last-mentioned two output terminals to the impedance of said apparatus input terminals thereby providing the same signal transmission loss on both said lines, looking in the direction from said last-mentioned two output terminals toward said first impedance and apparatus input terminals.

2. The system according to claim 1 in which said impedance matching means includes a second impedance removably connectable in shunt of the two output terminals having the lower impedance thereacross and of said apparatus input terminals when said line terminals of the higher impedance and said first impedance associated therewith are disconnected from said system, the impedances of said second impedance and at said apparatus input terminals so proportioned as to match the impedance across said last-mentioned two output terminals to said apparatus input terminals thereby providing the same signal transmission loss on both said lines, looking in the direction from said last-mentioned two output terminals toward said second impedance and apparatus input terminals.

3. The system according to claim 2 in which the different impedances at said two pairs of output terminals and the geometric mean impedance across said apparatus input terminals are effectively resistive.

4. The system according to claim 3 in which said first impedance comprises a resistor.

5. The system according to claim 4 in which the resistance value of said first resistor is substantially less than the value of the resistance across the two output terminals of the higher resistance value and the value of the geometric mean resistance across said apparatus input terminals.

6. The system according to claim 5 in which the sum of the values of said first resistor and geometric mean resistor equals the value of the effective resistance across said two output terminals of the higher resistance value.

7. The system according to claim 3 in which said second impedance comprises a resistor.

8. The system according to claim 7 in which the value of said second resistor is substantially greater than the value of the resistance at the two output terminals of the lower resistance value and the value of the geometric mean resistance across said apparatus input terminals.

9. The system according to claim 8 in which the sum of the values of said shunt second resistor and said geometric mean resistor equals the value of the effective resistance across said two output terminals of the lower resistance value.

References Cited in the file of this patent

UNITED STATES PATENTS 2,148,098 Bowman-Manifold ------ Feb. 21, 1939